United States Patent
Rasimas et al.

(10) Patent No.: US 6,590,493 B1
(45) Date of Patent: Jul. 8, 2003

(54) SYSTEM, DEVICE, AND METHOD FOR ISOLATING SIGNALING ENVIRONMENTS IN A POWER LINE COMMUNICATION SYSTEM

(75) Inventors: Jennifer G. Rasimas, Morrisville, NC (US); Stephen S. Jackson, Chapel Hill, NC (US)

(73) Assignee: Nortel Networks Limited (CA)

( * ) Notice: Subject to any disclaimer, the term of this patent is extended or adjusted under 35 U.S.C. 154(b) by 195 days.

(21) Appl. No.: 09/730,505

(22) Filed: Dec. 5, 2000

(51) Int. Cl.$^7$ .............................. N01N 37/36
(52) U.S. Cl. ................. 340/310.01; 340/310.02; 340/310.05; 340/310.06; 340/310.07
(58) Field of Search ............ 340/310.01, 310.02, 340/310.05, 310.06, 310.07

(56) References Cited

U.S. PATENT DOCUMENTS 5,581,229 A * 12/1996 Hunt ............... 340/310.02
5,777,769 A * 7/1998 Coutinho .............. 359/173
5,844,949 A * 12/1998 Hershey et al. ........... 375/346
5,952,914 A * 9/1999 Wynn ................ 340/310.01
6,297,729 B1 * 10/2001 Abali et al. ........... 340/310.01

* cited by examiner

*Primary Examiner*—Daniel J. Wu
*Assistant Examiner*—Tai T. Nguyen
(74) *Attorney, Agent, or Firm*—Steubing McGuinness & Manaras LLP

(57) ABSTRACT

Isolating signaling environments in a power line communication system involves the use of a filter to block power line data signals from entering and/or leaving a signaling environment while allowing power signals to pass to or from the signaling environment. Power line data signals are typically at a higher frequency than power signals, and therefore the filter is typically a low-pass filter, bandpass filter, or notch filter that blocks the higher frequency power line data signals while allowing the lower frequency power signals to pass through. The filter may be coupled between power side wires and outlet side wires. The filter may be integral to a circuit breaker for installation in a fuse box or other wiring system.

33 Claims, 10 Drawing Sheets

SYSTEM, DEVICE, AND METHOD FOR ISOLATING SIGNALING ENVIRONMENTS IN A POWER LINE COMMUNICATION SYSTEM

FIELD OF THE INVENTION

The invention relates generally to power line communication systems, and particularly to isolating signaling environments in a power line communication system.

BACKGROUND OF THE INVENTION

Power line modems are used for transmitting data signals over the same wires that carry AC power. They have a wide range of uses, including allowing personal computers to communicate with each other, or with other household devices, without the need for separate data cables. There is a continuing need, however, for methods to facilitate more widespread use of power line modems.

SUMMARY OF THE INVENTION

In accordance with one aspect of the invention, power line data signals, which are carried over common wiring with power signals, are blocked while allowing the power signals to continue on the common wiring. The power line data signals are typically at a higher frequency than the power signals, and therefore the power line data signals are typically blocked by installing at least one filter (such as a low-pass filter, bandpass filter, or notch filter) on the common wiring. The at least one filter blocks the higher frequency power line data signals while allowing the lower frequency power signals to continue on the common wiring. Within a signaling environment, the at least one filter is typically installed between a power source and a number of outlets, and more typically between a circuit breaker and the number of outlets.

In accordance with another aspect of the present invention, power line data signals originating outside the signaling environment are blocked from entering the signaling environment. Specifically, the at least one filter is installed at an ingress point of the signaling environment. The at least one filter blocks power line data signals originating outside the signaling environment from entering the signaling environment. One advantage of blocking the power line data signals originating outside the signaling environment from entering the signaling environment is to prevent the power line data signals originating outside the signaling environment from interfering with power line communications within the signaling environment.

In accordance with yet another aspect of the present invention, power line data signals originating inside the signaling environment are blocked from leaving the signaling environment. Specifically, the at least one filter is installed at an egress point of the signaling environment. The at least one filter blocks power line data signals originating inside the signaling environment from leaving the signaling environment. One advantage of blocking power line data signals originating inside the signaling environment from leaving the signaling environment is to prevent power line communication within the signaling environment from interfering with power line communications in other signaling environments. Another advantage of blocking power line data signals originating inside the signaling environment from leaving the signaling environment is to prevent the interception and monitoring of power line communications from outside of the signaling environment.

In accordance with still another embodiment of the present invention, power line data signals originating outside the signaling environment are blocked from entering the signaling environment, and power line data signals originating inside the signaling environment are blocked from leaving the signaling environment. This may be accomplished, for example, by installing a single filter capable of blocking both incoming and outgoing power line data signals, or by installing separate ingress and egress filters for blocking the incoming and outgoing power line data signals, respectively.

In accordance with still another aspect of the invention, a filter for blocking power line data signals while allowing power signals to pass includes power side connectors for coupling the filter to power supply wires, outlet side connectors for coupling the filter to outlet wires, and filtering logic electrically coupled between the power side connectors and the outlet side connectors for blocking power line data signals while allowing power signals to pass through from the power side connectors to the outlet side connectors. The filtering logic may be coupled so as to block power line data signals received over the power side connectors from passing through to the outlet side connectors and/or block power line data signals received over the outlet side connectors from passing through to the power side connectors, while allowing power signals to pass through from the power side connectors to the outlet side connectors.

In accordance with still another aspect of the invention, a circuit breaker and filter are combined in the form of a circuit breaker that can replace an existing circuit breaker in a fuse box. The filter is typically coupled between the circuit breaker and the protected circuits. More specifically, such a device includes power side connectors for coupling to power supply wires, outlet side connectors for coupling to outlet wires, a circuit breaker electrically coupled between the power side connectors and the outlet side connectors, and filtering logic electrically coupled between the circuit breaker and the outlet side connectors for blocking power line data signals while allowing power signals to pass through from the power side connectors to the outlet side connectors. The filtering logic may be coupled so as to block power line data signals received over the power side connectors from passing through to the outlet side connectors and/or block power line data signals received over the outlet side connectors from passing through to the power side connectors, while allowing power signals to pass through from the power side connectors to the outlet side connectors.

DESCRIPTION OF ILLUSTRATIVE EMBODIMENTS

Figure 1A:
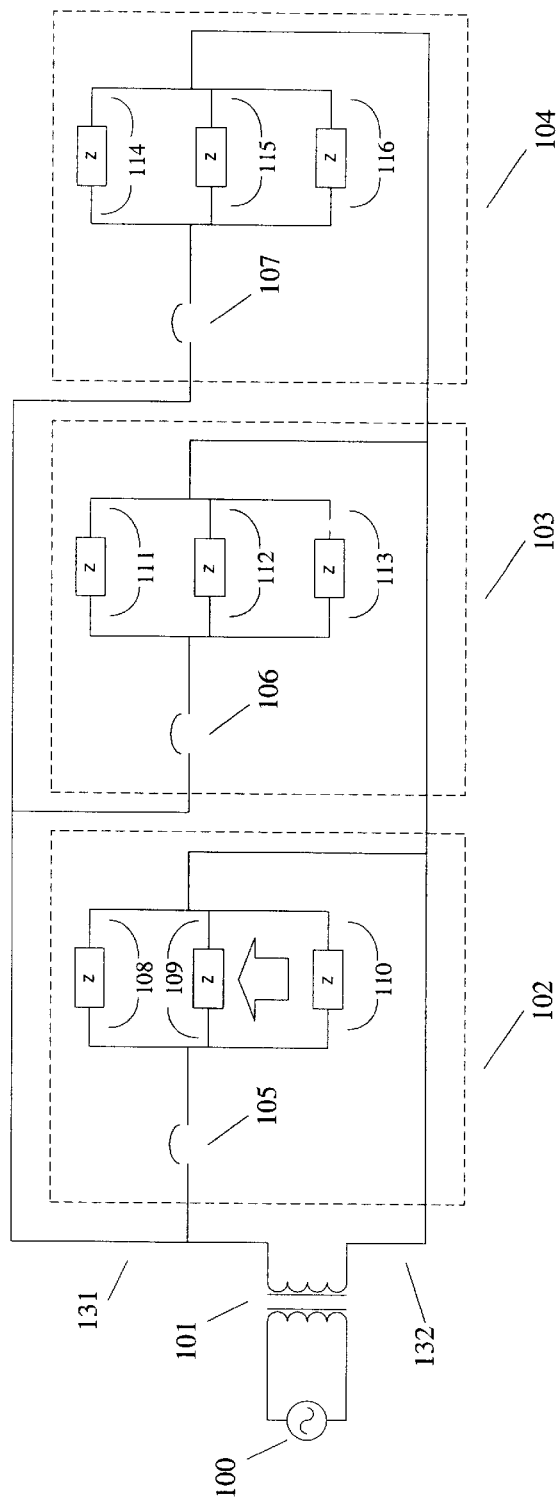
FIG. 1A shows an example of a simplified wiring plan for providing AC power to multiple signaling environments.

Illustrative embodiments of the invention facilitate use of a power line modem in a particular signaling environment by isolating the signaling environment from other signaling environments. For purposes of this discussion, the term "signaling environment" refers to a power line communication environment, which can include a circuit, a portion of a circuit, or multiple interconnected circuits. Each circuit typically includes a number of outlets protected by a circuit breaker. For purposes of this discussion, the term "outlet" refers to anything electrically coupled to the signaling environment wiring, including, but not limited to, receptacles, switches, hard-wired fixtures (e.g., lighting, smoke detectors, HVAC systems), and plug-in appliances and devices. For purposes of this discussion, the term "circuit breaker" refers to a current limiting device, including, but not limited to, a fuse, a circuit breaker, and a ground fault circuit interrupter. A signaling environment may include a main circuit breaker through which power is provided to the various circuits and outlets.

The filters are used in one or more of the signaling environments to block the ingress and/or egress of power line data signals. For purposes of this discussion, the term "block" refers to elimination of the power line data signal or reduction (attenuation) of the power line data signal to an acceptably low level.

The filters typically block high-frequency power line data signals, but pass the lower frequency power signal. A filter is typically coupled in-line with the power supplied to the signaling environment, for example, between the main circuit breaker of the signaling environment and the remaining circuits/outlets of the signaling environment. Within a particular signaling environment, the filter may be used to block power line data signals originating outside of the signaling environment from entering the signaling environment and/or block power line data signals originating within the signaling environment from leaving the signaling environment. Blocking the power line data signals at the ingress point of a signaling environment makes the signaling environment independent of the other signaling environments (i.e., the signaling environment is isolated from the other signaling environments whether or not the other signaling environments prevent egress of their respective power line data signals). Blocking the power line data signals at the egress point of a signaling environment prevents other signaling environments from receiving the power line data signal, therefore providing some control, privacy, and security. It should be noted that the filter prevents ingress and/or egress of power line data signals without itself interfering with or otherwise preventing power line communications within the signaling environment. Thus, the filter does not interfere with or otherwise prevent power line communications between the outlets of the signaling environment, although the filter does block power line data signals originating outside of the signaling environment from entering the signaling environment and/or block power line data signals originating within the signaling environment from leaving the signaling environment.

In one embodiment of the invention, a low-pass filter is used to block the high-frequency power line data signals while allowing the lower frequency power signal to pass. However, the present invention is in no way limited to the use of a low-pass filter or to any particular type of filter. Any filter that blocks the high-frequency power line data signals but allows the lower frequency power signal to pass can be used. Thus, for example, the filter may be a low-pass filter, a bandpass filter, or a notch filter, to name but a few. For the sake of convenience, various embodiments of the present invention are described herein with reference to a low-pass filter. It should be noted that other types of filters may be substituted for the low-pass filter in various alternative embodiments.

Figure 6A:
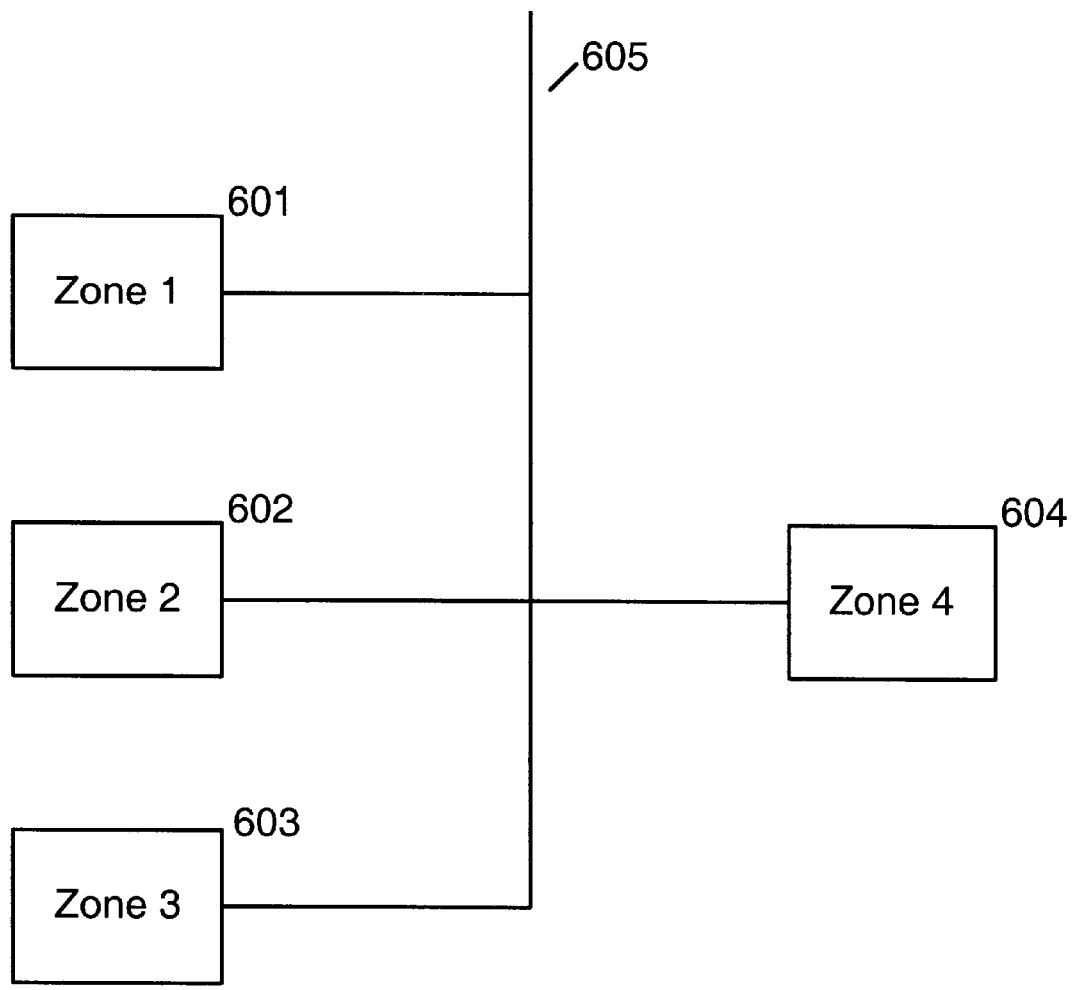
FIG. 6A shows an example of a system having four electrically-connected wiring zones in accordance with an embodiment of the invention.

FIG. 6A shows an example of a power line communication system having four signaling environments 601–604 that are electrically-coupled over common wiring 605. Electrical power is provided to all four signaling environments 601–604 over the common wiring 605. Data signals transmitted by one signaling environment over the common wiring 605 reaches the other signaling environments.

Figure 6B:
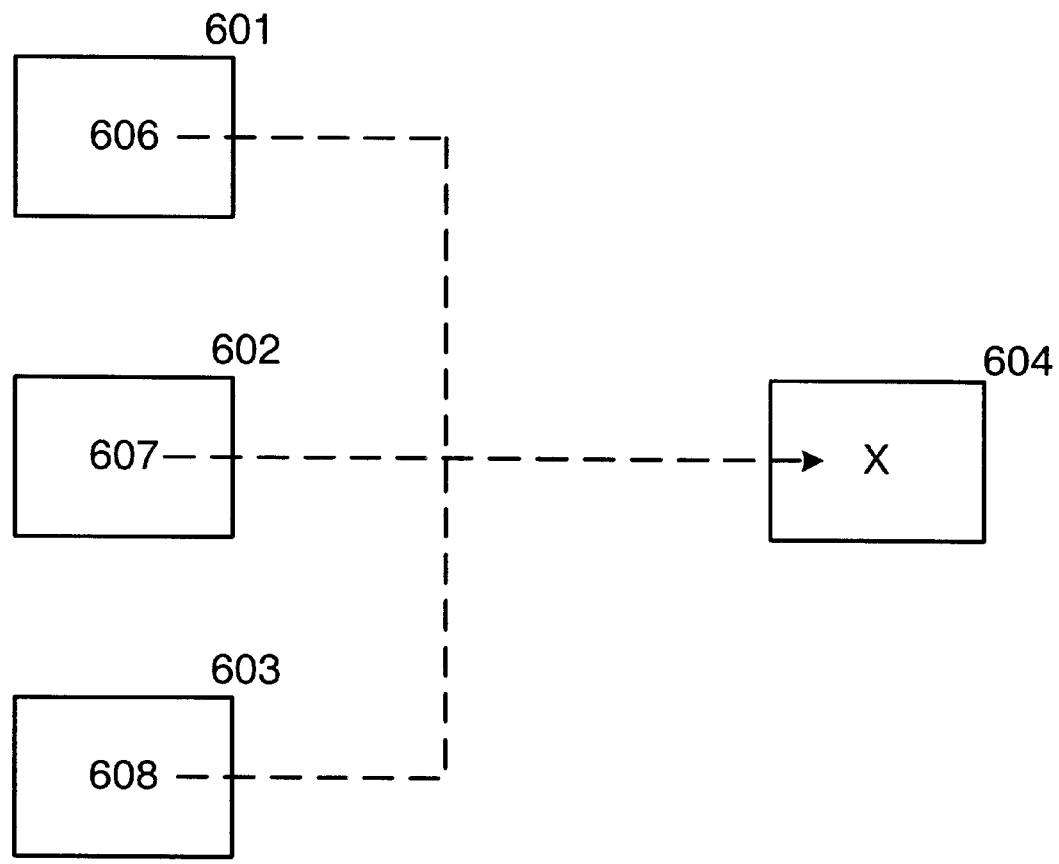
FIG. 6B shows an example of a system having four electrically-connected wiring zones in which power line data signals are blocked at the ingress point of a wiring zone in accordance with an embodiment of the invention.

FIG. 6B shows a situation in which power line data signals are blocked at the ingress point of a signaling environment. Specifically, signaling environments 60–603 generate power line data signals 606–608, respectively. In this example, the power line data signals 606–608 are not blocked at the egress points of signaling environments 601–603, respectively, and are therefore transmitted onto the common wiring 605 (not shown for convenience). All power line data signals 606–608 typically reach all signaling environments. However for the sake of simplicity, the power line data signals 606–608 are shown reaching signaling environment 604 only. Normally, the power line data signals 606–608 would interfere with power line communications in signaling environment 604. Therefore, signaling environment 604 includes a filter that is coupled to block the power line data signals 606–608 at the ingress point of signaling environment 604. In this way, power line communications within signaling environment 604 can proceed without interference from the power line data signals 606–608.

Figure 6C:
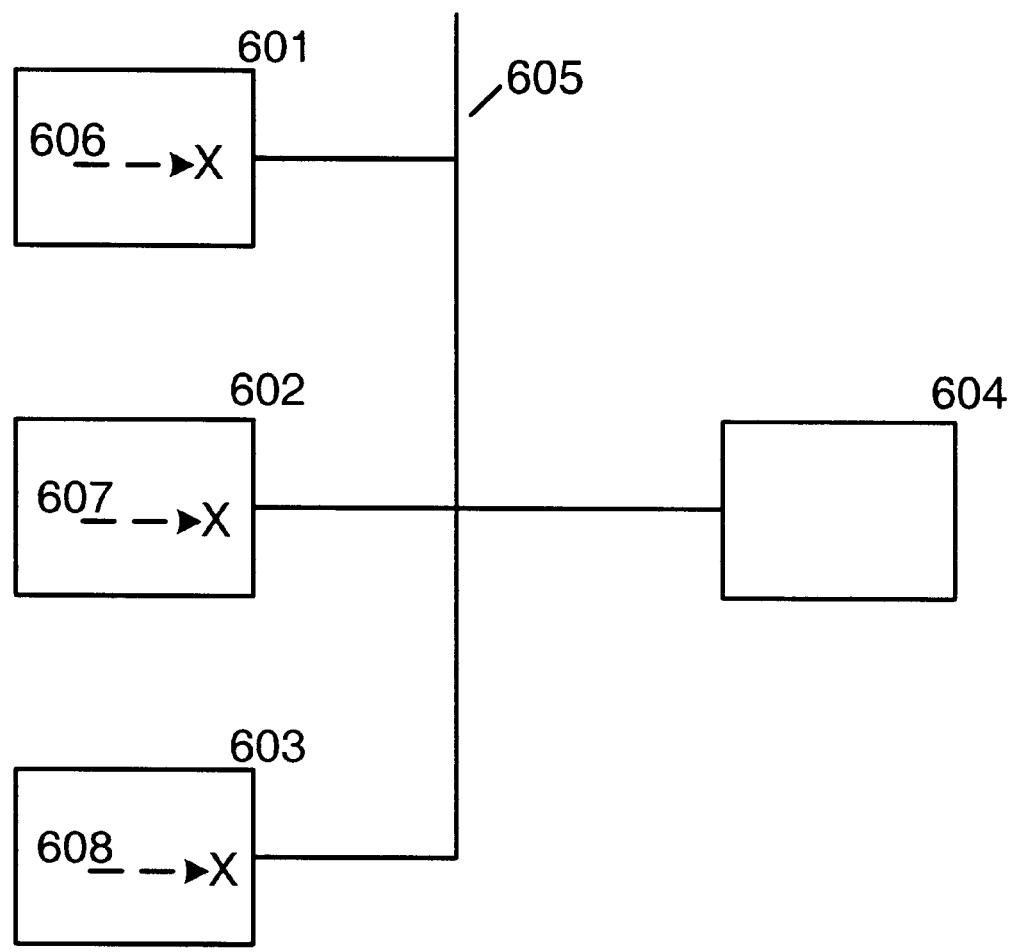
FIG. 6C shows an example of a system having four electrically-connected wiring zones in which power line data signals are blocked at the egress points of each wiring zone in accordance with an embodiment of the invention.

FIG. 6C shows a situation in which power line data signals are blocked at the egress points of the signaling environments. Specifically, signaling environments 601–603 generate power line data signals 606–608, respectively. Each signaling environment 601–603 includes a filter that is coupled to block its respective power line data signal 606–608 from being transmitted over the common wiring 605. Therefore, the power line data signals 606–608 are not received at signaling environment 604, so power line communications within signaling environment 604 can proceed without interference from the power line data signals 606–608.

It should be noted that filtering can be used to block power line data signals at both the ingress point and egress point of a signaling environment. Specifically, the signaling environment includes filtering circuitry capable of blocking power line data signals originating outside of the signaling environment from entering the signaling environment as well as blocking power line data signals originating within the signaling environment from leaving the signaling environment. The filtering circuitry may be, for example, a single filter capable of both ingress and egress filtering or separate ingress and egress filters.

FIG. 1A shows an example of a simplified wiring plan for providing AC power to multiple signaling environments. An AC power grid 100 delivers high-voltage power to a transformer 101. Transformer 101 in turn provides transformed, lower-voltage AC power to various signaling environments through phase wire 131 and return wire 132. Three signaling environments 102, 103, and 104 are shown for illustrative purposes in the example of FIG. 1A.

The signaling environments 102, 103, and 104 shown in FIG. 1A may represent multiple circuits within a home or building. Thus, with reference to FIG. 1A, signaling environment 102 including circuit breaker 105 and outlets 108–110 could represent a first circuit, signaling environment 103 including circuit breaker 106 and outlets 111–113 could represent a second circuit, and signaling environment 104 including circuit breaker 107 and outlets 114–116 could represent a third circuit.

The signaling environments 102, 103, and 104 shown in FIG. 1A may also represent individual homes or buildings that are interconnected over common wiring 131/132, where each signaling environment 102, 103, and 104 includes all circuits in the corresponding home or building. Thus, with reference to FIG. 1A, signaling environment 102 including main circuit breaker 105 and circuits 108–110 could represent a first home or building, signaling environment 103 including main circuit breaker 106 and circuits 111–113 could represent a second home or building, and signaling environment 104 including main circuit breaker 107 and circuits 114–116 could represent a third home or building. It should be noted that each circuit 108–110, 111–113, and 114–116 may include its own circuit breaker.

The signaling environments 102, 103, and 104 shown in FIG. 1A may also represent individual units in a multiple-unit building, where each signaling environment 102, 103, and 104 includes all circuits in the corresponding unit. Thus, with reference to FIG. 1A, signaling environment 102 including main circuit breaker 105 and circuits 108–110 could represent a first unit of a multiple-unit building, signaling environment 103 including main circuit breaker 106 and circuits 111–113 could represent a second unit of a multiple-unit building, and signaling environment 104 including main circuit breaker 107 and circuits 114–116 could represent a third unit of a multiple-unit building. It should be noted that each circuit 108–110, 111–113, and 114–116 may include its own circuit breaker.

Figure 1B:
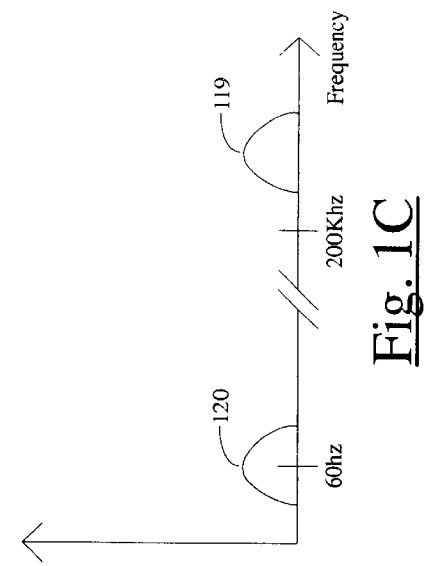
FIG. 1B shows the frequency distribution of transmitted signals within a signaling environment.

Power line modems may be used in signaling environments that are wired similarly to the wiring of FIG. 1A. A power line modem typically transmits the power line data signal over the power line at a substantially higher frequency than the low frequency power signal. As shown in FIG. 1B, the power signal 117 is typically a 60 Hz power signal, and the power line data signal 118 is typically in a frequency range above 200 KHz. Power line modems thus allow AC-connected devices to receive power line data signals over the same wiring from which AC power is received.

Figure 1C:
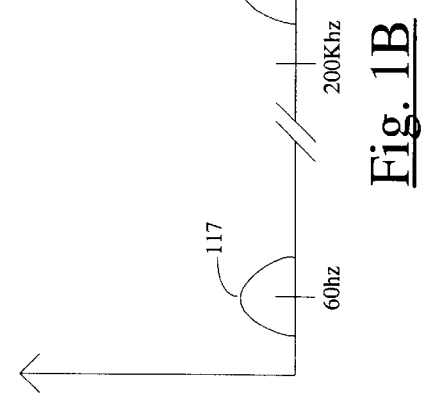
FIG. 1C shows the frequency distribution of received signals outside of a signaling environment in which filtering is not used to block power line data signals.

In an environment that is wired similarly to the wiring of FIG. 1A, power line communications in one signaling environment can interfere with power line communications in another signaling environment. Consider an example in which a power line device connected to circuit/outlet 110 transmits a high-frequency power line data signal 118 that is intended to reach a power line device connected to circuit/outlet 109 within signaling environment 102. Because the signaling environment 102 is coupled to signaling environments 103 and 104 over the common wiring 131/132, the power line data signal 118 is received by power line devices in signaling environments 103 and 104. FIG. 1C shows a representation of the frequency spectrum received at circuits/outlets 108 and 109 in signaling environment 102, at circuits/outlets 111–113 in signaling environment 103, and at circuits/outlets 114–116 in signaling environment 104, including power signal 120 and power line data signal 119. It should be noted that frequency decompositions (e.g. Fourier Transform representations) of the transmitted signal 118 and the received signals 119 are substantially the same. Thus, the transmitted signal 118 from signaling environment 102 would interfere with power line communications in signaling environments 103 and 104.

Figure 2A:
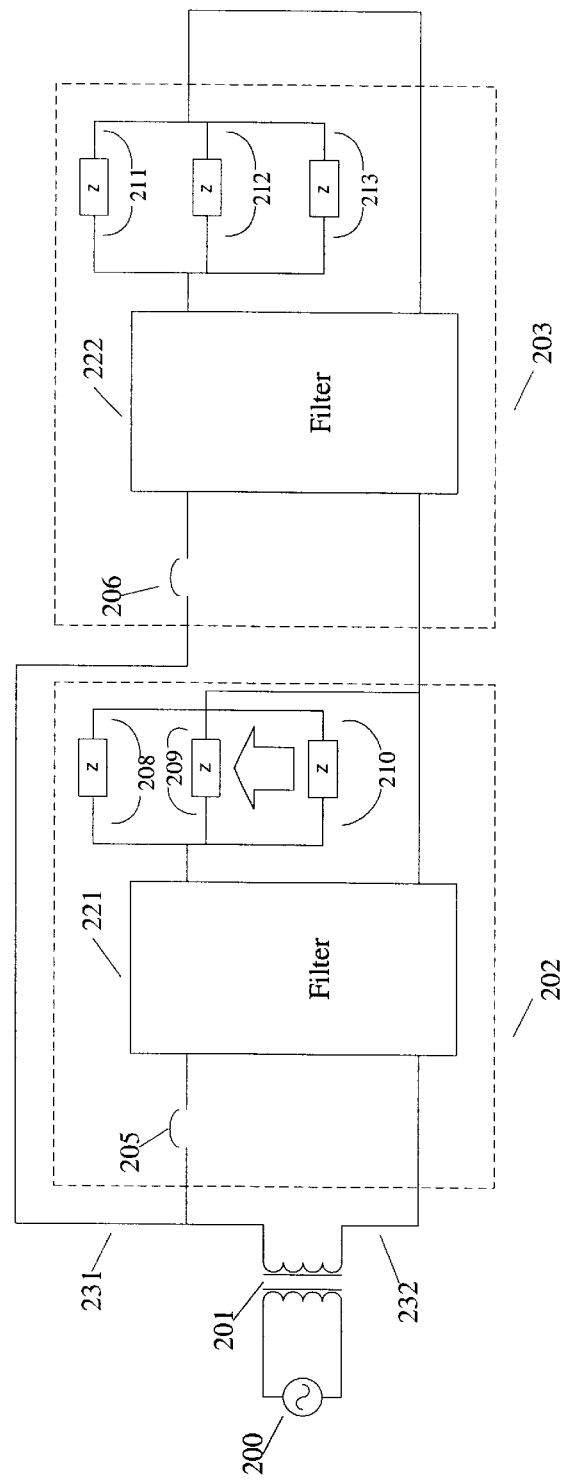
FIG. 2A shows an example of a simplified wiring plan for isolating a signaling environment in accordance with an embodiment of the present invention.

FIG. 2A shows an example of a simplified wiring plan for isolating a signaling environment in accordance with an embodiment of the present invention. As in FIG. 1, an AC power grid 200 delivers high-voltage power to a transformer 201. Transformer 201 in turn provides transformed, lower-voltage AC power to various signaling environments through phase wire 231 and return wire 232. For the sake of simplicity, FIG. 2A shows only two signaling environments 202 and 203.

In one embodiment of the present invention, the signaling environments 202 and 203 shown in FIG. 2A represent multiple circuits within a home or building. Thus, with reference to FIG. 2A, signaling environment 202 including circuit breaker 205 and outlets 208–210 could represent a first circuit, and signaling environment 203 including circuit breaker 206 and outlets 211–213 could represent a second circuit.

In another embodiment of the present invention, the signaling environments 202 and 203 shown in FIG. 2A represent individual homes or buildings that are interconnected over the common wiring 231/232, where each signaling environment 202 and 203 includes all circuits in the corresponding home or building. Thus, with reference to FIG. 2A, signaling environment 202 including main circuit breaker 205 and circuits 208–210 could represent a first home or building, and signaling environment 203 including main circuit breaker 206 and circuits 211–213 could represent a second home or building. It should be noted that each circuit 208–210 and 211–213 may include its own circuit breaker.

In yet another embodiment of the present invention, the signaling environments 202 and 203 shown in FIG. 2A represent individual units in a multiple-unit building, where each signaling environment 202 and 203 includes all circuits in the corresponding unit. Thus, with reference to FIG. 2A, signaling environment 202 including main circuit breaker 205 and circuits 208–210 could represent a first unit of a multiple-unit building, and signaling environment 203 including main circuit breaker 206 and circuits 211–213 could represent a second unit of a multiple-unit building. It should be noted that each circuit 208–210 and 211–213 may include its own circuit breaker.

Figure 2C:
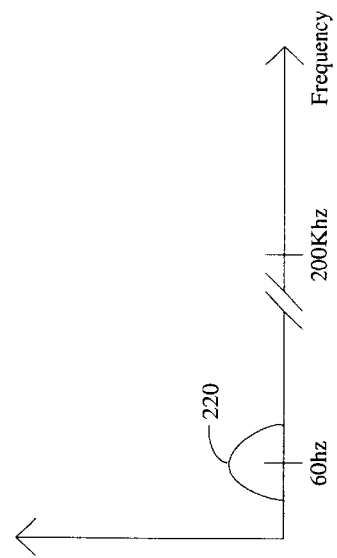
FIG. 2C shows the frequency distribution of received signals outside of a signaling environment in which filtering is used to block power line data signals in accordance with an embodiment of the present invention.
Figure 2B:
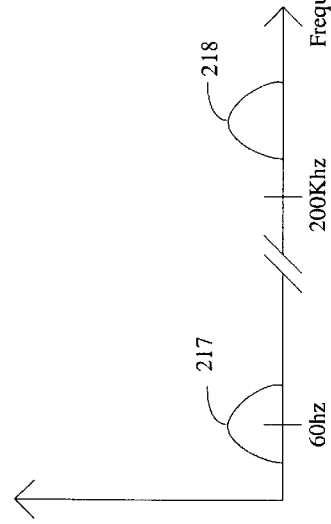
FIG. 2B shows the frequency distribution of transmitted and received signals within a signaling environment in accordance with an embodiment of the present invention.

Power line modems may be used in signaling environments that are wired similarly to the wiring of FIG. 2A. A power line modem typically transmits the power line data signal over the power line at a substantially higher frequency than the low frequency power signal. As shown in FIG. 2B, the power signal 217 is typically a 60 Hz power signal, and the power line data signal 218 is typically in a frequency range above 200 KHz. Power line modems thus allow AC-connected devices to receive power line data signals over the same wiring from which AC power is received.

In an embodiment of the invention, a filter is used to block power line data signals originating in signaling environment 202 from reaching signaling environment 203 and/or block power line data signals originating in signaling environment 203 from interfering with power line communications in signaling environment 202. The filter is typically coupled in-line somewhere between the transformer 201 and the circuits/outlets 208–210, in this example between the circuit breaker 205 and the circuits/outlets 208–210 within signaling environment 202. The filter 221 can be configured to block power line data signals on the phase/return wires 231/232 from reaching the circuits/outlets 208–210 and/or to block power line data signals from the circuits/outlets 208–210 from reaching the phase/return wires 231/232.

The filter 221 typically includes four terminals, one pair for connecting the filter 221 to the circuit breaker side of the wiring and the other pair for connecting the filter 221 to the circuit/outlet side of the wiring. Each pair of terminals includes a terminal for coupling to the phase wire and a terminal for coupling to the return wire. The filter 221 blocks power line data signals entering through one pair of terminals (input terminals) from passing through to the other pair of terminals (output terminals).

In one embodiment of the invention, the filter 221 is coupled to block power line data signals from the circuits/outlets 208–210 from reaching the phase/return wires 231/232. Specifically, the input terminals of the filter 221 are coupled on the circuit/outlet side of the wiring, while the output terminals of the filter 221 are coupled on the circuit breaker side of the wiring. In this configuration, the filter 221 blocks high-frequency power line data signals from the circuits/outlets 208–210 from reaching the phase/return wires 231/232, but allows the low-frequency power signals to pass from the phase/return wires 231/232 to the circuits/outlets 208–210.

With the filter 221 configured to block power line data signals from the circuits/outlets 208–210 from reaching the phase/return wires 231/232, power line communications within signaling environment 202 will not interfere with power line communications within signaling environment 203. For example, consider the case in which a power line device connected to circuit/outlet 210 transmits a high-frequency power line data signal 218 that is intended to reach a power line device connected to circuit/outlet 209 within signaling environment 202. FIG. 2B shows a representation of the frequency spectrum received at circuits/outlets 208 and 209 in signaling environment 202, including power signal 217 and power line data signal 218. However, the filter 221 blocks the power line data signal 218 from reaching signaling environment 203. FIG. 2C shows a representation of the frequency spectrum received at circuits/outlets 211–213 in signaling environment 203, including power signal 220 but excluding the power line data signal. Thus, the transmitted signal 218 from signaling environment 202 does not interfere with power line communications in signaling environment 203.

In another embodiment of the invention, the filter 221 is coupled to block power line data signals on the phase/return wires 231/232 from reaching the circuits/outlets 208–210. In this case, the input terminals of the low-pass filter 221 are coupled on the circuit breaker side of the wiring, while the output terminals of the low-pass filter 221 are coupled on the circuit/outlet side of the wiring. In this configuration, the filter 221 blocks high-frequency power line data signals on the phase/return wires 231/232 from reaching the circuits/outlets 208–210, but allows the low-frequency power signals to pass from the phase/return wires 231/232 to the circuits/outlets 208–210.

With the filter 221 configured to block power line data signals from the phase/return wires 231/232 from reaching the circuits/outlets 208–210, power line communications outside of signaling environment 202 will not interfere with power line communications within signaling environment 203. For example, consider the case in which a power line device outside of signaling environment 202 transmits a high-frequency power line data signal 218 onto phase/return wires 231/232. FIG. 2B shows a representation of the frequency spectrum of the transmitted signals, including power signal 217 and power line data signal 218. However, the filter 221 blocks the power line data signal 218 from reaching the circuits/outlets 208–210. FIG. 2C shows a representation of the frequency spectrum received at circuits/outlets 208–210 in signaling environment 202, including power signal 220 but excluding the power line data signal. Thus, the transmitted signal 218 does not interfere with power line communications in signaling environment 202.

In yet another embodiment of the invention, the filter 221 is configured to block both power line data signals on the phase/return wires 231/232 from reaching the circuits/outlets 208–210 and power line data signals from the circuits/outlets 208–210 from reaching the phase/return wires 231/232. For example, a single filter capable of filtering in both directions may be coupled between the phase/return wires 231/232 and the circuits/outlets 208–210, or two separate filters may be coupled between the phase/return wires 231/232 and the circuits/outlets 208–210 in such a way that an ingress filter blocks power line data signals on the phase/return wires 231/232 from reaching the circuits/outlets 208–210 and an egress filter blocks power line data signals from the circuits/outlets 208–210 from reaching the phase/return wires 231/232.

With the filter 221 configured to block both power line data signals on the phase/return wires 231/232 from reaching the circuits/outlets 208–210 and power line data signals from the circuits/outlets 208–210 from reaching the phase/return wires 231/232, power line communications within the signaling environment 202 will not interfere with power line communications outside of the signaling environment 202, and power line communications outside of the signaling environment 202 will not interfere with power line communications within the signaling environment 202.

By adding a similar filter 222 to signaling environment 203, power line data signals could similarly be prevented from entering and/or leaving the signaling environment 203.

Note that, while FIGS. 1B and 2B show the power signal and the power line data signal at 60 Hz and above 200 KHz, respectively, these frequencies may vary depending upon, for example, the different power frequencies and power line modem conventions used throughout the world. In particular, high-speed power line data communication signals are often in a frequency range above 1 MHz.

Figure 3B:
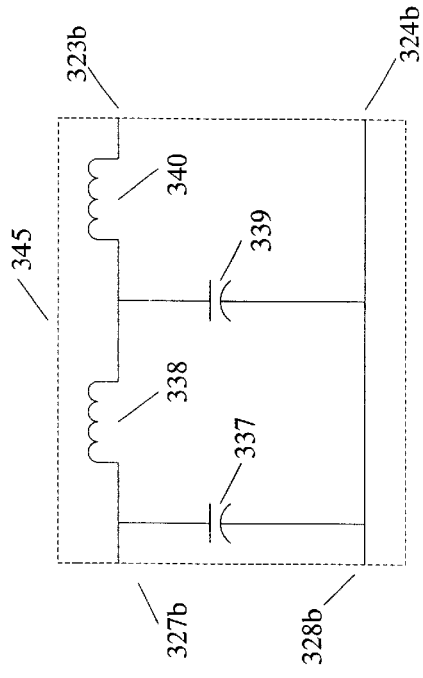
FIG. 3B shows a sample LCLC filter for blocking power line data signals in accordance with an embodiment of the present invention.
Figure 3D:
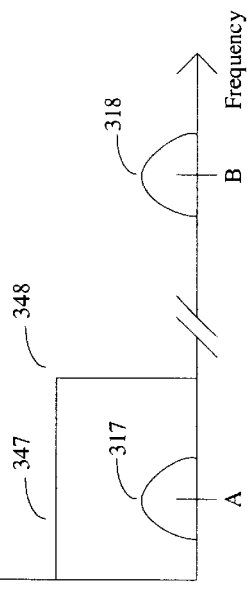
FIG. 3D shows the transfer function of an ideal low-pass filter on the same axes as power and data frequency distributions.
Figure 3A:
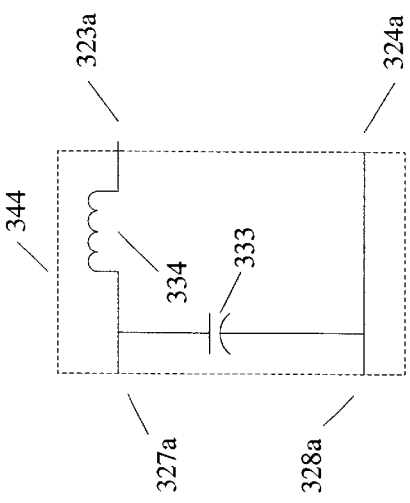
FIG. 3A shows a sample LC filter for blocking power line data signals in accordance with an embodiment of the present invention.
Figure 3C:
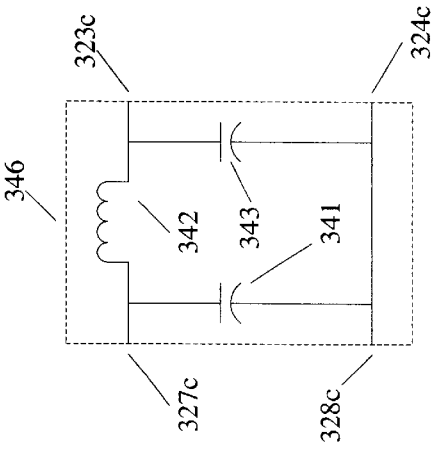
FIG. 3C shows a sample CLC filter for blocking power line data signals in accordance with an embodiment of the present invention.

In various embodiments of the invention, the filter 221 is a low-pass filter that blocks the high-frequency power line data signal while allowing the low-frequency power signal to pass. Any of a variety of low-pass filter configurations can be used for the filter 221. FIG. 3A shows a simple LC filter 344 having input terminals 323a and 324a, inductor 334, capacitor 333, and output terminals 327a and 328a. FIG. 3B shows an LCLC filter 345 having input terminals 323b and 324b, two inductors 338 and 340, two capacitors 337 and 339, and output terminals 327b and 328b. FIG. 3C shows a CLC filter 346 having input terminals 323c and 324c, an inductor 342, two capacitors 341 and 343, and output terminals 327c and 328c.

Filters need not be chosen from the examples shown. An ideal low-pass filter has a transfer function H(ω) with a corner, as in transfer function 347 of FIG. 3D. As can be seen in FIG. 3D, this transfer function allows signals at frequencies lower than its corner frequency 348 to pass through, but blocks signals at frequencies higher than its corner frequency. While actual low-pass filters do not achieve an ideal corner, approximate corner frequencies can nevertheless be identified. In an embodiment according to the invention, a filter is chosen so that the corner frequency of its transfer function falls between the frequency distribution of the power signal 317 and the frequency distribution of the data signal 318. In a simple LC filter, for example, the corner frequency (in cycles per second, instead of angular frequency ω) is given by:

$$f_c = \frac{1}{2\pi\sqrt{LC}}$$

In an embodiment according to the invention, for example, it may be convenient to select the component values for the filter by locating the filter's corner frequency at the geometric mean frequency of the central frequencies of the power signal frequency distribution and the data signal frequency distribution. For example, if the central frequencies are A and B respectively, as in FIG. 3D, the corner frequency could be chosen to equal:

$$f_c = \sqrt{AB}$$

Other methods for selecting appropriate low pass filters will be apparent to those of ordinary skill in the art.

Figure 4A:
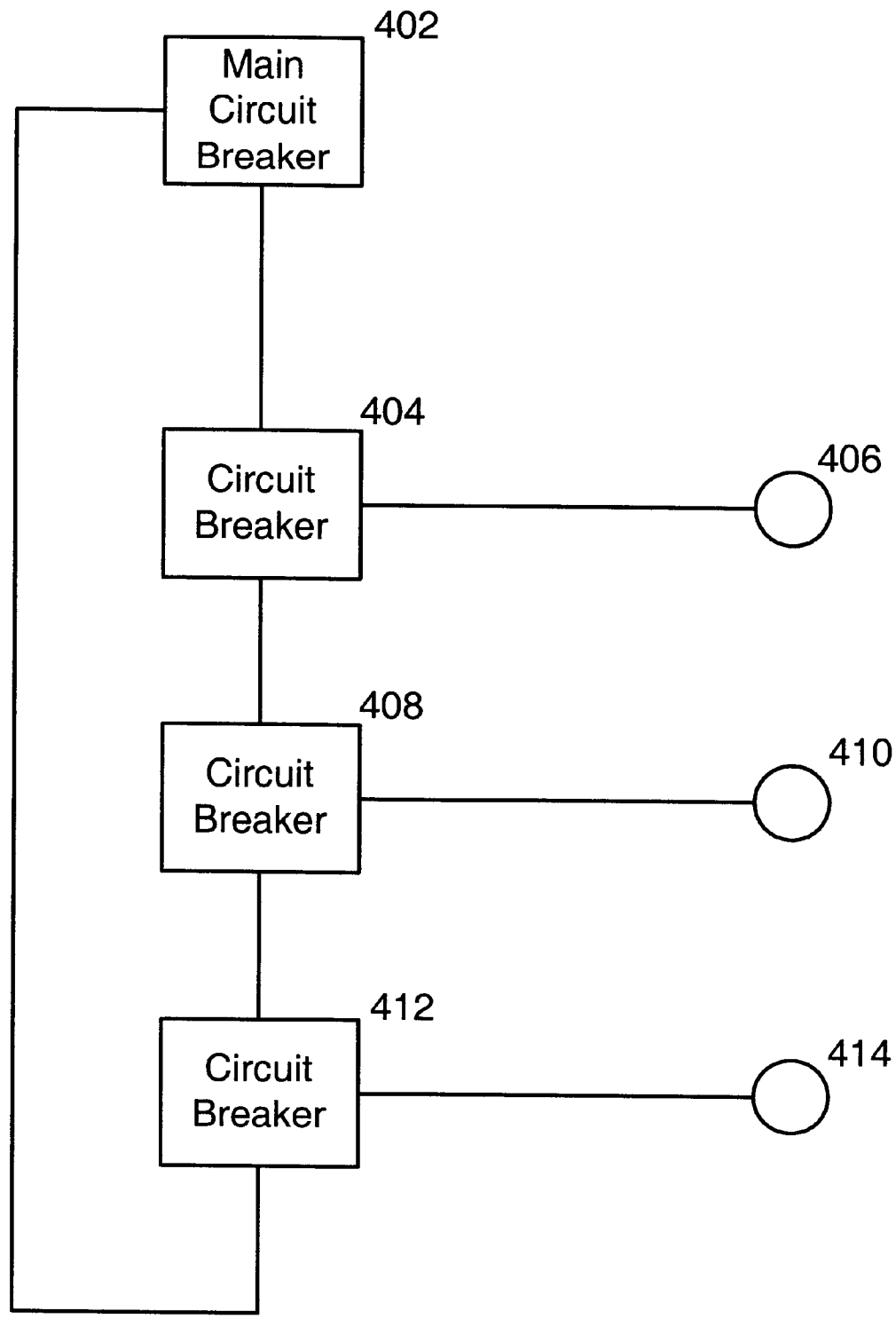
FIG. 4A shows a representation of a circuit breaker arrangement as might be found in a fuse box of a home or building.

FIG. 4A shows a representation of a circuit breaker arrangement as might be found in a fuse box of a home or building. Electric power is supplied through the main circuit breaker 402 to the circuit breakers 404, 408, and 412 for circuits/outlets 406, 410, and 414, respectively. Circuits/outlets 406, 410 and 414 may include additional circuit breakers, for example, in a subpanel arrangement. Among other things, circuits/outlets 406, 410 and 414 may represent separate wiring zones in a home or building that typically do not have additional circuit breakers, or may represent individual units in a multiple-unit building that typically have additional circuit breakers for circuits/outlets within each unit.

Figure 4B:
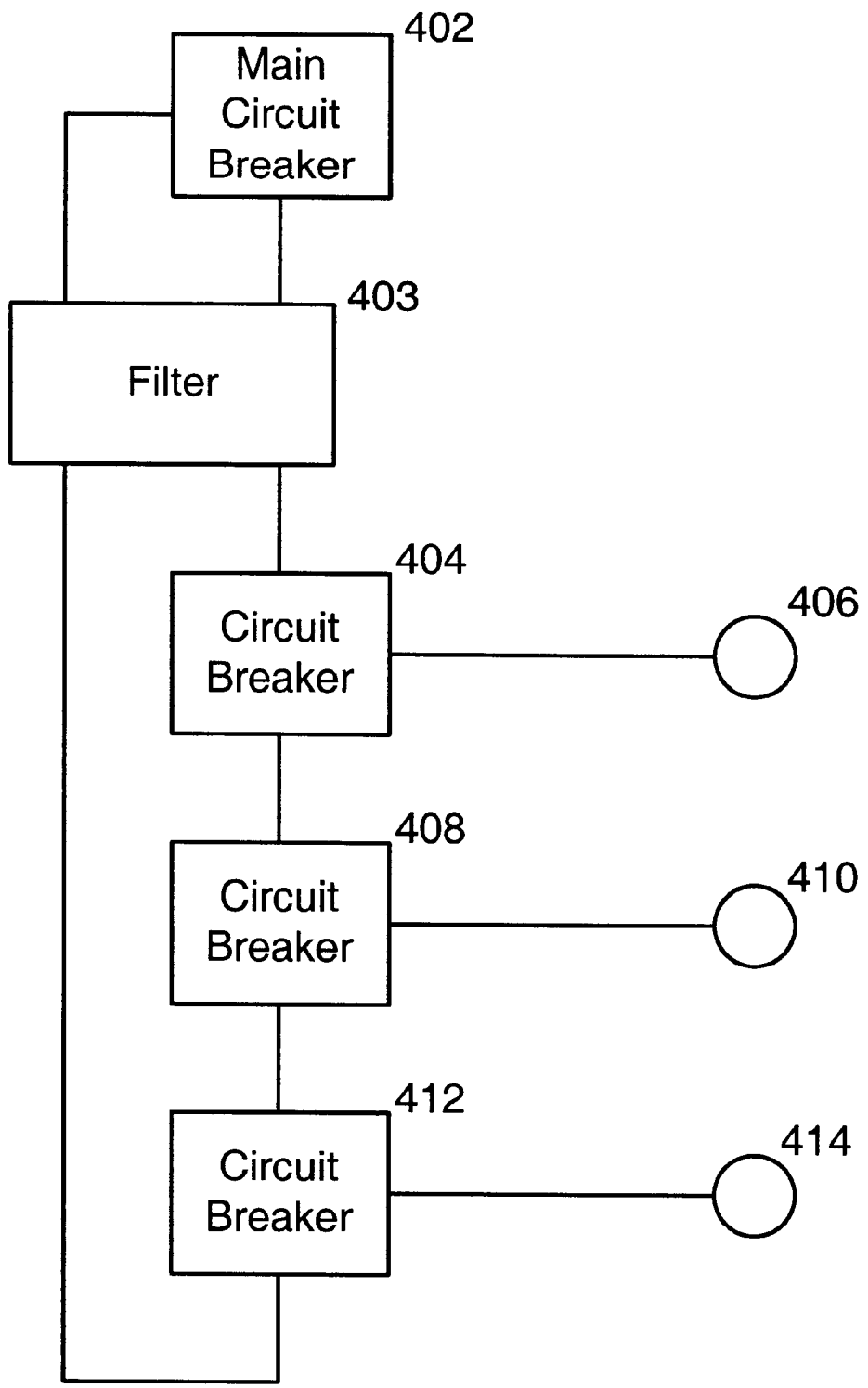
FIG. 4B shows a representation of the circuit breaker arrangement of FIG. 4A in which a filter is coupled between the main circuit breaker and the other circuit breakers in accordance with an embodiment of the present invention.

FIG. 4B shows a representation of the circuit breaker arrangement of FIG. 4A in which all circuits/outlets 406, 410, and 414 are treated as a single signaling environment. In this case, filter 403 is coupled between the main circuit breaker 402 and the other circuit breakers 404, 408, and 412. The filter 403 enables power signals from the main circuit breaker 402 to pass through to the circuit breakers 404, 408, and 412, but blocks power line data signals originating outside the signaling environment from entering the signaling environment and/or blocks power line data signals originating within the signaling environment from leaving the signaling environment. The filter 403 does not block power line data signals between circuits/outlets 406, 410, and 414.

Figure 4C:
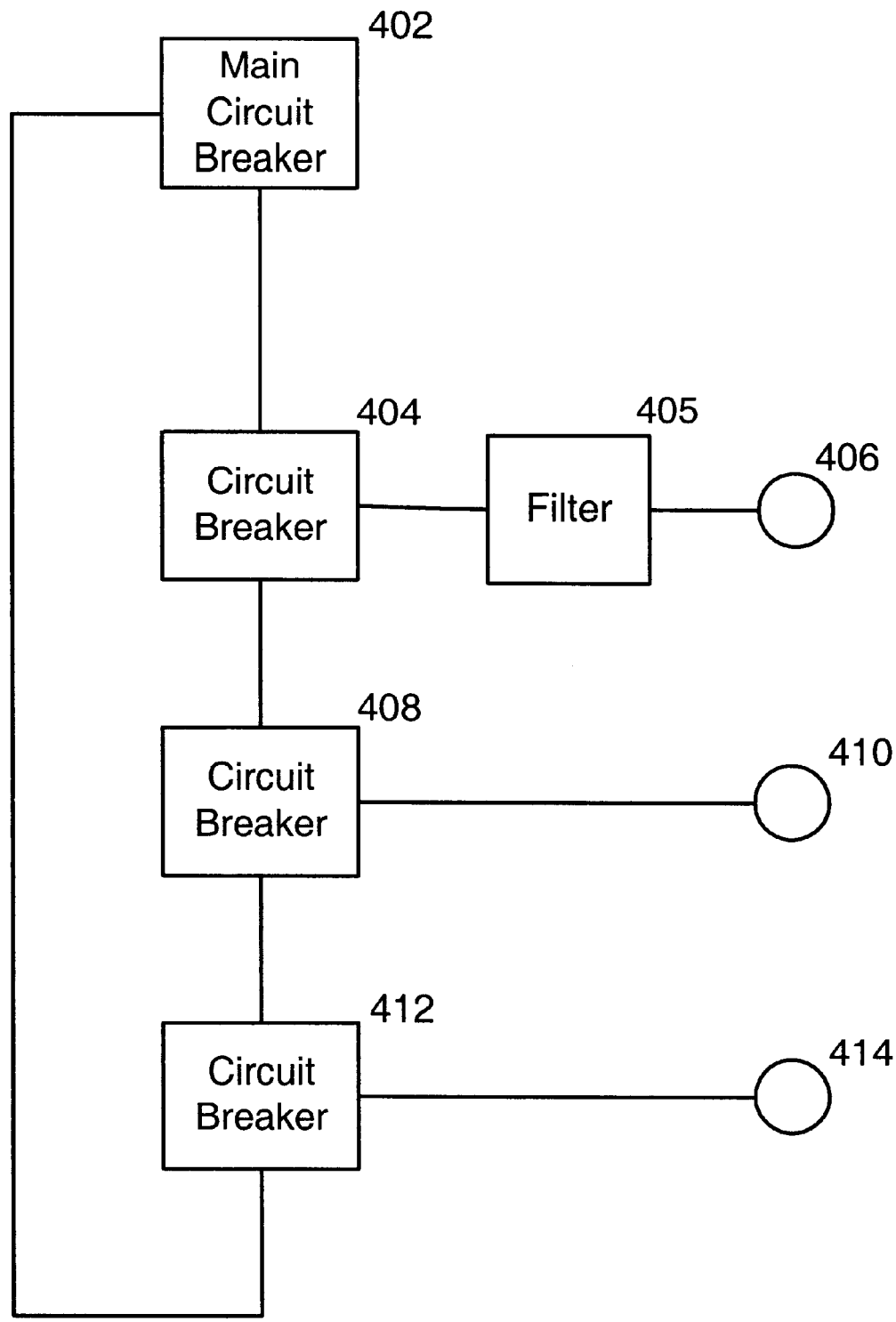
FIG. 4C shows a representation of the circuit breaker arrangement of FIG. 4A in which a filter is coupled between a circuit breaker and its corresponding circuits/outlets in accordance with an embodiment of the present invention.

FIG. 4C shows a representation of the circuit breaker arrangement of FIG. 4A in which the circuits/outlets 406 are treated as a single signaling environment. In this case, filter 405 is coupled between the circuit breaker 404 and the remaining circuits/outlets 406. The filter 405 enables power signals from the circuit breaker 404 to pass through to the circuits/outlets 406, but blocks power line data signals originating outside the signaling environment from entering the signaling environment and/or blocks power line data signals originating within the signaling environment from leaving the signaling environment. The filter 405 does not block power line data signals within circuits/outlets 406.

It should be noted that a filter need not be installed within the confines of a signaling environment in order to isolate the signaling environment from other signaling environments. For one example, the filter may be installed between signaling environments. For another example, the filter may be installed outside of a signaling environment (e.g., at the power company feed to each building/unit or in the electric meter for each building/unit). The filter may be coupled within the confines of the fuse box or outside of the fuse box.

Figure 5:
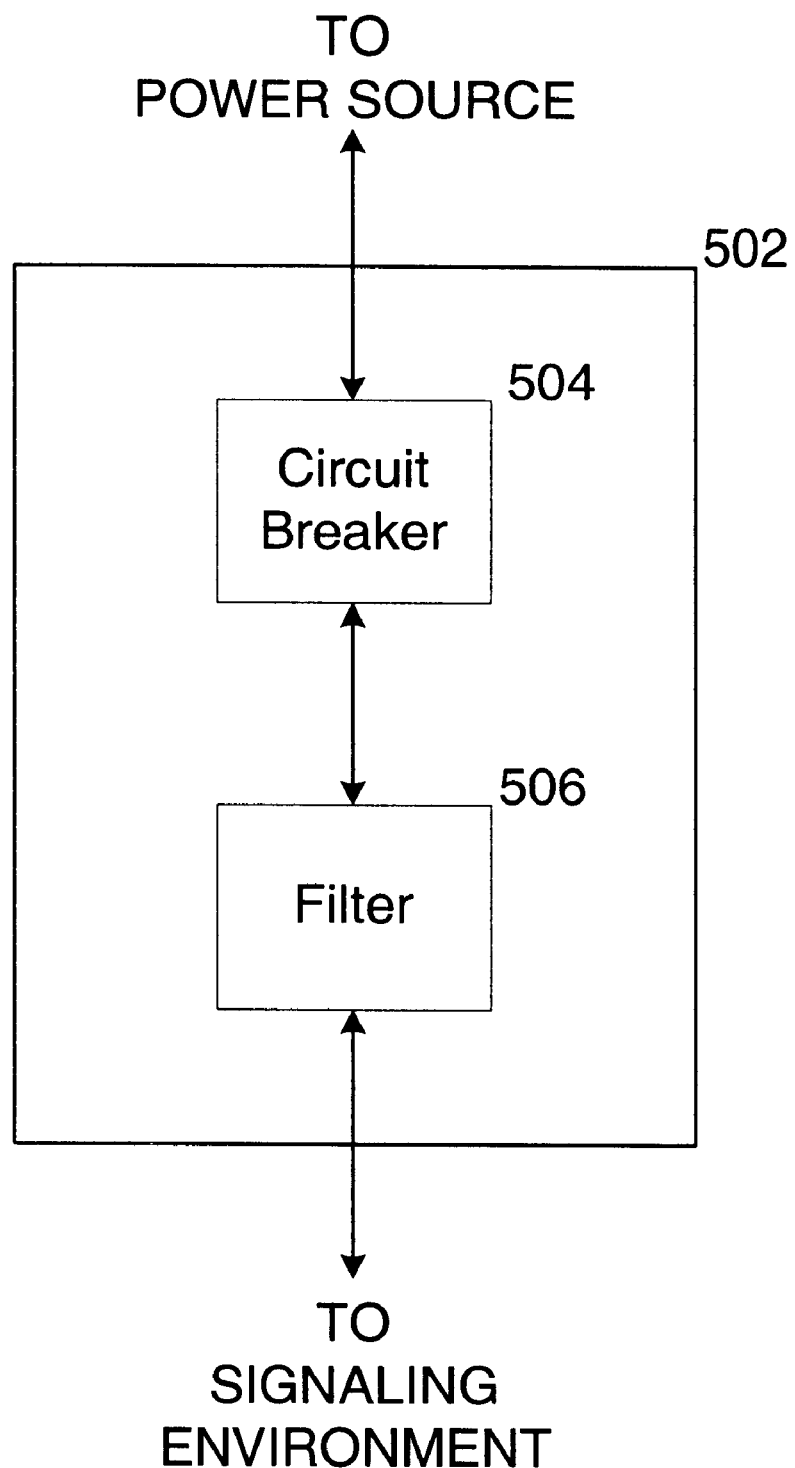
FIG. 5 shows a circuit breaker apparatus having an integral low-pass filter in accordance with an embodiment of the invention.

A filter for use in an embodiment of the invention is preferably packaged in a form that is easy to install. In one embodiment of the invention, the filter is integral to the circuit breaker package and is coupled so as to be between the circuit breaker and the remaining circuits/outlets that are protected by the circuit breaker. Such a combination circuit breaker and filter preferably fits in a standard circuit breaker slot within the fuse box, and so can be installed simply by removing a standard circuit breaker and replacing it with the combination circuit breaker and low-pass filter. FIG. 5 shows a representation of a circuit breaker with integral filter. The circuit breaker package 502 houses both a circuit breaker 504 and a filter 506. The filter 506 is preferably coupled between the circuit breaker 504 and the remaining wiring of the wiring zone. With reference to FIG. 4B, the filter 403 may be integral to main circuit breaker 402. With reference to FIG. 4C, the filter 405 may be integral to circuit breaker 404.

It should be noted that the present invention is in no way limited to the use of a low-pass filter or to any particular type of filter. Any filter that blocks the high-frequency power line data signals but allows the lower frequency power signal to pass can be used. Thus, for example, the filter may be a low-pass filter, a bandpass filter, or a notch filter, to name but a few. Various low-pass filter configurations are included for the sake of discussion, and the present invention is in no way limited to those low-pass filter configurations shown.

It should also be noted that there is no limitation on the placement of filters within a system. Among other things, filters can be used to isolate an entire wiring circuit, a portion of a wiring circuit, or multiple interconnected wiring circuits.

The present invention may be embodied in other specific forms without departing from the true scope of the invention. The described embodiments are to be considered in all respects only as illustrative and not restrictive.

What is claimed is:

1. A method for isolating a signaling environment for power line communications, the signaling environment having power line data signals and power signals carried over common wiring, the method comprising:

blocking the power line data signals on the common wiring including installing at least one filter on the common wiring for blocking the power line data signals, the at least one filter being located at an ingress/egress point of the common wiring for blocking power line data signals originating outside the signaling environment from entering the signaling environment and blocking the power line data signals originating inside the signaling environment from leaving the signaling environment; and allowing the power signals to continue on the common wiring.

2. The method of claim 1, wherein the power line data signals are at a higher frequency than the power signals, and wherein the at least one filter blocks the higher frequency power line data signals and allows the lower-frequency power signals to continue on the common wire.

3. The method of claim 2, wherein the at least one filter comprises at least one of:

a low-pass filter;

a bandpass filter; and a notch filter.

4. The method of claim 1, wherein the signaling environment includes a number of outlets coupled to a power source over the common wiring, and wherein installing the at least one filter on the common wiring for blocking the power line data signals comprises:

installing the at least one filter between the power source and the outlets.

5. The method of claim 4, wherein installing the at least one filter between the power source and the number of outlets comprises:

installing a circuit breaking including the at least one filter on the common wiring between the power source and the number of outlets.

6. The method of claim 4, wherein the number of outlets are coupled through a circuit breaker to the power source over the common wiring, and wherein installing the at least one filter between the power source and the number of outlets comprises:

installing the at least one filter on the common wiring between the circuit breaker and the number of outlets.

7. The method of claim 1, wherein blocking the power line data signals on the common wiring comprises blocking power line data signals originating outside the signaling environment from entering the signaling environment, and wherein installing the at least one filter on the common wiring for blocking the power line data signals comprises installing the at least one filter at an ingress point of the common wiring for blocking the power line data signals originating outside the signaling environment from entering the signaling environment.

8. The method of claim 1, wherein blocking the power line data signals on the common wiring comprises blocking power line data signals originating inside the signaling environment from leaving the signaling environment, and wherein installing the at least one filter on the common wiring for blocking the power line data signals comprises installing the at least one filter at an egress point of the common wiring for blocking the power line data signals originating inside the signaling environment from leaving the signaling environment.

9. The method of claim 1, wherein the at least one filter comprises a single filter capable of blocking power line data signals originating outside the signaling environment from entering the signaling environment and blocking power line data signals originating inside the signaling environment from leaving the signaling environment.

10. The method of claim 1, wherein the at least one filter comprises:

an ingress filter for blocking the power line data signals originating outside the signaling environment from entering the signaling environment; and an egress filter for blocking the power line data signals originating inside the signaling environment from leaving the signaling environment.

11. A power line communication system comprising a plurality of signaling environments interconnected over common wiring, wherein a signaling environment is isolated by blocking power line data signals on the common wiring and allowing power signals to continue on the common wiring; the system comprising:

at least one filter for blocking the power line data signals, wherein the at least one filter is electrically coupled at an ingress/egress point of the isolated signaling environment for blocking power line data signals originating outside the signaling environment from entering the signaling environment and blocking power line data signals originating inside the signaling environment from leaving the signaling environment.

12. The power line communication system of claim 11, wherein the power line data signals are at higher frequency than the power signals, and wherein the at least one filter blocks the higher frequency power line data signals and allows the lower-frequency power signals to continue on the common wiring.

13. The power line communication system of claim 12, wherein the at least one filter comprises at least one of:

a low-pass filter;

a bandpass filter; and a notch filter.

14. The power line communication system of claim 11, wherein the signaling environment includes a number of outlets coupled to a power source over the common wiring, and wherein the at least one filter is electrically coupled on the common wiring between the power source and the outlets.

15. The power line communication system of claim 14, wherein the at least one filter comprises a combination circuit breaker/filter.

16. The power line communication system of claim 14, wherein the number of outlets are coupled through a circuit breaker to the power source over the common wiring, and wherein the at least one filter is electrically coupled on the common between the circuit breaker and the number of outlets.

17. The power line communication system of claim 11, wherein the at least one filter is electrically coupled at an ingress point of the isolating signaling environment for blocking power line data signals originating outside the signaling environment from entering the signaling environment.

18. The power line communication system of claim 11, wherein the at least one filter is electrically coupled at an egress point of the isolated signaling environment for blocking power line data signals originating inside the signaling environment from leaving the signaling environment.

19. The power line communication system of claim 11, wherein the at least one filter comprises a single filter capable of blocking power line data signals originating outside the signaling environment from entering the signaling environment and blocking power line data signals originating inside the signaling environment from leaving the signaling environment.

20. The power line communication system of claim 11, wherein the at least one filter comprises:

an ingress filter for blocking the power line data signals originating outside the signaling environment from entering the signaling environment; and an egress filter for blocking the power line data signals originating inside the signaling environment from leaving the signaling environment.

21. The power line communication system of claim 11, wherein the plurality of signaling environments comprises a plurality of zones within a structure interconnected by a common power source.

22. The power line communication system of claim 11, wherein the plurality of signaling environments comprises a plurality of separate structures interconnected by a common power source.

23. A filter for use in a power line communication system, the filter comprising:

power side connectors for coupling the filter to power supply wires;

outlet side connectors for coupling the filter to outlet wires; and filtering logic electrically coupled between the power side connectors and the outlet side connectors for blocking power line data signals while allowing power signals to pass through from the power side connectors to the outlet side connectors, the filtering logic comprising an ingress filter for blocking the power line data signals received over the power side connectors from passing through to the outlet side connectors and an egress filter for blocking the power line data signals received over the outlet side connectors from passing through to the power side connectors.

24. The filter of claim 23, wherein the power line data signals are at a higher frequency than the power signals, and wherein the filtering logic blocks the higher frequency power line data signals while allowing the lower-frequency power signals to pass through from the power side connectors to the outlet side connectors.

25. The filter of claim 24, wherein the filtering logic comprises at least one of:

a low-pass filter;

a bandpass filter; and a notch filter.

26. The filter of claim 23, wherein the filtering logic is electrically coupled to block power line data signals received over the power side connectors from passing through to the outlet side connectors while allowing power signals to pass through from the power side connectors to the outlet side connectors.

27. The filter of claim 23, wherein the filtering logic is electrically coupled to block power line data signals received over the outlet side connectors from passing through to the power side connectors while allowing power signals to pass through from the power side connectors to the outlet side connectors.

28. The filter of claim 23, wherein the filtering logic is electrically coupled to block power line data signals received over the power side connectors from passing through to the outlet side connectors and block power line data signals received over the outlet side connectors from passing through to the power side connectors while allowing power signals to pass through from the power side connectors to the outlet side connectors.

29. A device comprising;

power side connectors for coupling to power supply wires;

outlet side connectors for coupling to outlet wires;

a circuit breaker electrically coupled between the power side connectors and the outlet side connectors; and filtering logic electrically coupled between the circuit breaker and the outlet side connectors for blocking power line data signals while allowing power signals to pass through from the power side connectors to the outlet side connectors, wherein the filtering logic is electrically coupled to block power line data signals received over the power side connectors from passing through to the outlet side connectors and block power line data signals received over the outlet side connectors from passing through to the power side connectors while allowing power signals to pass through from the power side connectors to the outlet side connectors.

30. The device of claim 29, wherein the power line data signals are at a higher frequency than the power signals, and wherein the filtering logic blocks the higher frequency power line data signals while allowing the lower-frequency power signals to pass through from the power side connectors to the outlet side connectors.

31. The device of claim 30, wherein the filtering logic comprises at least one of:

a low-pass filter;

a bandpass filter; and a notch filter.

32. The device of claim 29, wherein the filtering logic comprises a single filter capable of blocking power line data signals received over the power side connectors from passing through to the outlet side connectors and blocking power line data signals received over the outlet side connectors from passing through to the power side connectors.

33. The device of claim 29, wherein the filtering logic comprises:

an ingress filter for blocking the power line data signals received over the power side connectors from passing through to the outlet side connectors; and an egress filter for blocking the power line data signals received over the outlet side connectors from passing through to the power side connectors.

* * * * *